United States Patent
Takatsu et al.

(10) Patent No.: US 7,556,872 B2
(45) Date of Patent: Jul. 7, 2009

(54) ADSORBENT FOR REMOVING SULFUR COMPOUND, PROCESS FOR PRODUCING HYDROGEN AND FUEL CELL SYSTEM

(75) Inventors: Kozo Takatsu, Chiba (JP); Gakuji Takegoshi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 7 days.

(21) Appl. No.: 10/526,397

(22) PCT Filed: Aug. 26, 2003

(86) PCT No.: PCT/JP03/10781
§ 371 (c)(1),
(2), (4) Date: Mar. 2, 2005

(87) PCT Pub. No.: WO2004/022224
PCT Pub. Date: Mar. 18, 2004

(65) Prior Publication Data
US 2005/0271913 A1 Dec. 8, 2005

(30) Foreign Application Priority Data
Sep. 5, 2002 (JP) .............................. 2002-259768
May 28, 2003 (JP) .............................. 2003-150293

(51) Int. Cl.
*H01M 8/04* (2006.01)
*C01B 3/22* (2006.01)
*C01B 3/26* (2006.01)

(52) U.S. Cl. ...................... 429/19; 252/373; 423/648.1; 423/651; 423/652; 423/653; 423/654; 429/17

(58) Field of Classification Search ................ 502/400; 423/650, 651, 652, 653, 654, 648.1; 252/373; 429/17, 19
See application file for complete search history.

(56) References Cited

U.S. PATENT DOCUMENTS

| | | | | |
|---|---|---|---|---|
| 5,268,346 A | * | 12/1993 | Ino et al. ..................... | 502/304 |
| 5,326,737 A | * | 7/1994 | Kay et al. .................... | 502/400 |
| 5,426,083 A | | 6/1995 | Bhattacharyya et al. | |

(Continued)

FOREIGN PATENT DOCUMENTS

EP 318808 6/1989

(Continued)

*Primary Examiner*—Wayne Langel
(74) *Attorney, Agent, or Firm*—Oblon, Spivak, McClelland, Maier & Neustadt, P.C.

(57) ABSTRACT

The present invention provides an adsorbent for removing sulfur compounds, which adsorbent can effectively remove a variety of sulfur compounds contained in a hydrocarbon fuel to a low concentration even at room temperature; a process for effectively producing hydrogen that can be used in a fuel cell; and a fuel cell system employing hydrogen produced through the process.

The adsorbent for removing a sulfur compound contained in a hydrocarbon fuel contains cerium oxide. The process for producing hydrogen that can be used in a fuel cell includes desulfurizing a hydrocarbon fuel through removal of a sulfur compound contained in the a hydrocarbon fuel by use of the aforementioned adsorbent and, subsequently, bringing the thus-desulfurized fuel into contact with a partial-oxidation reforming catalyst, an authothermal reforming catalyst, or a steam reforming catalyst. The fuel cell system employs hydrogen produced through the process.

10 Claims, 1 Drawing Sheet

U.S. PATENT DOCUMENTS

| | | | |
|---|---|---|---|
| 5,843,862 A * | 12/1998 | Bhattacharyya | 502/411 |
| 6,541,419 B2 * | 4/2003 | Shore et al. | 502/400 |
| 6,562,753 B2 * | 5/2003 | Miyoshi et al. | 502/325 |
| 6,914,033 B2 * | 7/2005 | Gislason et al. | 502/400 |
| 2003/0078162 A1 * | 4/2003 | Martin et al. | 502/407 |

FOREIGN PATENT DOCUMENTS

| | | | |
|---|---|---|---|
| EP | 0629438 * | 12/1994 | 502/400 |
| JP | 6-254389 * | 9/1994 | 502/400 |
| JP | 10-151341 | 6/1998 | |
| JP | 10-165805 | 6/1998 | |
| JP | 2001-279260 | 10/2001 | |
| WO | 02/66578 | 8/2002 | |

* cited by examiner

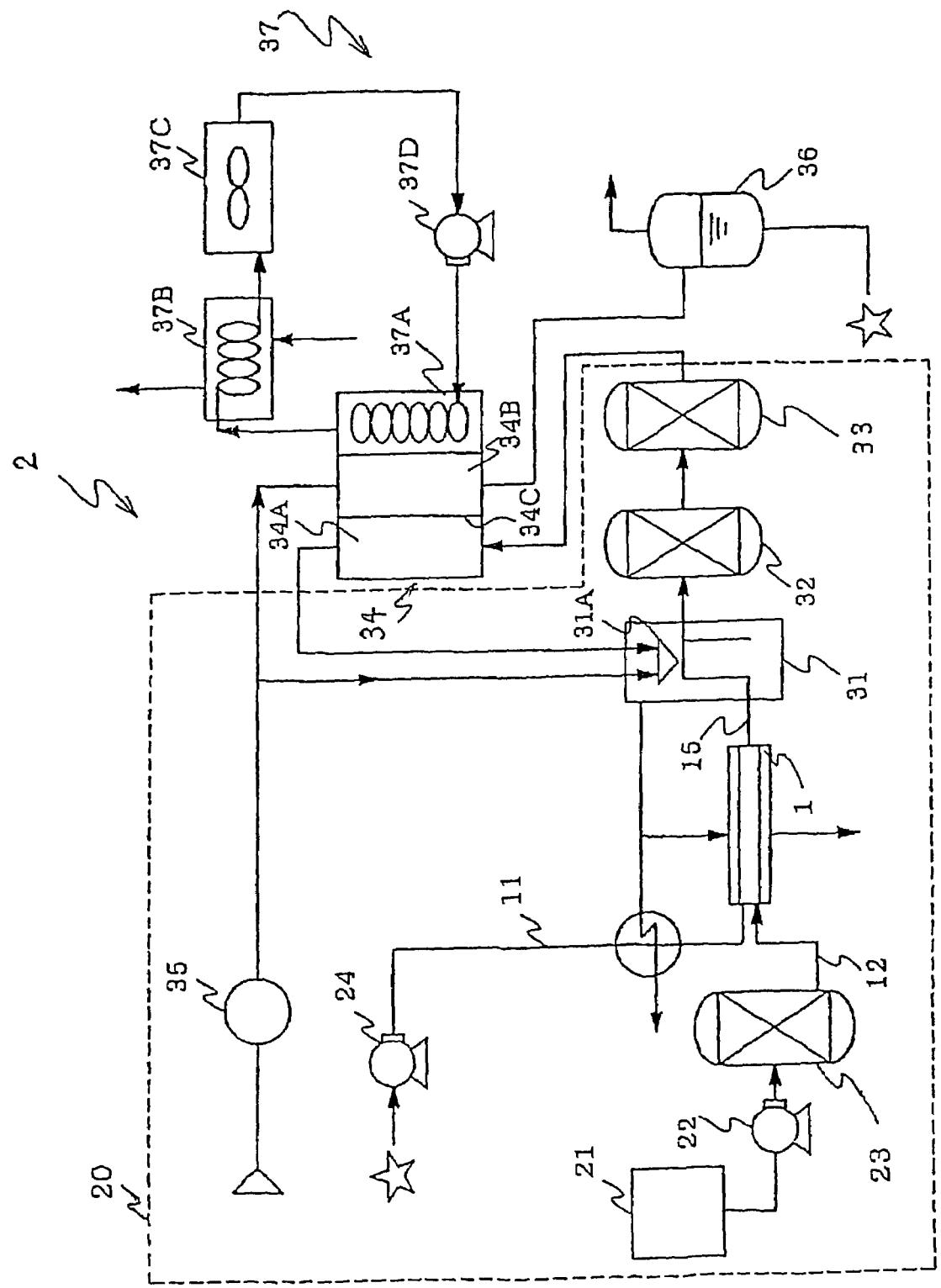

ADSORBENT FOR REMOVING SULFUR COMPOUND, PROCESS FOR PRODUCING HYDROGEN AND FUEL CELL SYSTEM

TECHNICAL FIELD

The present invention relates to an adsorbent for removing sulfur compounds, to a process for producing hydrogen, and to a fuel cell system. More particularly, the invention relates to an adsorbent for removing sulfur compounds, which adsorbent can effectively remove a variety of sulfur compounds contained in a hydrocarbon fuel to a low concentration even at room temperature; to a process for effectively producing hydrogen that can be used in a fuel cell, from the hydrocarbon fuel which has been desulfurized by use of the adsorbent; and to a fuel cell system employing hydrogen produced through the process.

BACKGROUND ART

In recent years, new energy-production techniques have attracted attention from the standpoint of environmental issues, and among these techniques a fuel cell has attracted particular interest. The fuel cell converts chemical energy to electric energy through electrochemical reaction of hydrogen and oxygen, attaining high energy utilization efficiency. Therefore, extensive studies have been carried out on realization of fuel cells for civil use, industrial use, automobile use, etc.

Fuel cells are categorized in accordance with the type of employed electrolyte, and a phosphate type, a fused carbonate salt type, a solid oxide type, and a solid polymer type have been known. With regard to hydrogen sources, studies have been conducted on methanol; liquefied natural gas predominantly containing methane; town gas predominantly containing natural gas; a synthetic liquid fuel produced from natural gas serving as a feedstock; and petroleum-derived hydrocarbons such as LPG, naphtha, and kerosene.

When hydrogen is produced from these gas or liquid hydrocarbons, the hydrocarbons are generally partial-oxidation-reformed, autothermal-reformed, or steam-reformed, in the presence of a reforming catalyst.

When a hydrocarbon fuel such as LPG, town gas, or kerosene is reformed so as to produce hydrogen serving as a fuel, the sulfur content of the hydrocarbon fuel must be reduced to 0.1 ppm or lower in order to prevent poisoning of the reforming catalyst. When a hydrocarbon such as propylene or butene is employed as a feedstock for petrochemical products, the sulfur content of the hydrocarbon must be reduced to 0.1 ppm or lower in order to prevent poisoning of the reforming catalyst.

The aforementioned LPG generally contains sulfur compounds such as methylmercaptan and carbonyl sulfide (COS), and an odorant such as dimethylsulfide (DMS), t-butylmercaptan (TBM), or methyl ethyl sulfide is intentionally added thereto. Recently, research efforts have been devoted to utilization of oxygen-containing hydrocarbon compounds, such as dimethyl ether, as a fuel. Although no sulfur compound is included in the oxygen-containing hydrocarbon compounds, studies have been conducted on intentional addition of the aforementioned odorant to the hydrocarbon compounds, because the odorant would effectively warn gas leakage.

There have been known a variety of adsorbents which adsorb sulfur compounds contained in a hydrocarbon fuel such as LPG or town gas so as to remove the compounds from the fuel. Although some of these known adsorbents exhibit excellent desulfurization performance at about 150 to about 300° C., currently attained desulfurization performance at ambient temperature is not satisfactory.

There have been disclosed desulfurizing agents; for example, desulfurizing agents containing hydrophobic zeolite and a metallic element such as Ag, Cu, Zn, Fe, Co, or Ni carried thereon through ion-exchange (see, for example, Japanese Patent Application Laid-Open (kokai) No. 2001-286753) and desulfurizing agents containing Y-, β-, or X-type zeolite and Ag or Cu carried thereon (see, for example, Japanese Patent Application Laid-Open (kokai) No. 2001-305123). These desulfurizing agents effectively adsorb, at room temperature, mercaptans and sulfides contained in a fuel so as to remove the sulfur compounds from the fuel, but adsorb virtually no carbonyl sulfide.

Copper-zinc desulfurizing agents are also disclosed (see, for example, Japanese Patent Application Laid-Open (kokai) No. 2-302496). Although the desulfurizing agents adsorb a variety of sulfur compounds at 150° C. or higher so as to remove the compounds, sulfur compound adsorption performance at 100° C. or lower is unsatisfactory. Also disclosed is a desulfurizing agent containing a porous carrier (e.g., alumina) and copper carried thereon (see, for example, Japanese Patent Application Laid-Open (kokai) No. 2001-123188). The desulfurizing agent can also be employed at 100° C. or lower, but its adsorption performance is not sufficient.

DISCLOSURE OF THE INVENTION

Under such circumstances, an object of the present invention is to provide an adsorbent for removing sulfur compounds, which adsorbent can effectively remove a variety of sulfur compounds contained in a hydrocarbon fuel to a low concentration even at room temperature. Another object of the invention is to provide a process for effectively producing hydrogen that can be used in a fuel cell, from the hydrocarbon fuel which has been desulfurized by use of the adsorbent. Still another object of the invention is to provide a fuel cell system employing hydrogen produced through the process.

The present inventors have carried out extensive studies in order to attain the aforementioned objects, and have found that cerium oxide, particularly cerium oxide having a mean crystallite size of 10 nm or less, exhibits excellent performance of adsorbing a variety of sulfur compounds even at ambient temperature, and that hydrogen that can be used in a fuel cell can be effectively produced through reforming of the hydrocarbon fuel which has been desulfurized by use of the adsorbent. The present invention has been accomplished on the basis of these findings.

Accordingly, the present invention provides the following.

(1) An adsorbent for removing a sulfur compound contained in a hydrocarbon fuel, characterized in that the adsorbent comprises cerium oxide.

(2) An adsorbent for removing a sulfur compound as described in (1) above, wherein the adsorbent has a specific surface area of 20 m$^2$/g or more.

(3) An adsorbent for removing a sulfur compound as described in (1) above, wherein the adsorbent has a specific surface area of 50 m$^2$/g or more.

(4) An adsorbent for removing a sulfur compound as described in (1) above, wherein the cerium oxide has a mean crystallite size of primary particles of 10 nm or less.

(5) An adsorbent for removing a sulfur compound as described in (1) above, wherein the cerium oxide exhibits a cumulative hydrogen consumption, as calculated up to 600° C. in a temperature-programmed reduction test, of 200 μmol/g or more.

(6) An adsorbent for removing a sulfur compound as described in (1) above, wherein the cerium oxide exhibits a cumulative hydrogen consumption, as calculated up to 600° C. in a temperature-programmed reduction test, of 300 µmol/g or more.

(7) An adsorbent for removing a sulfur compound as described in (1) above, wherein the adsorbent contains a mixture of cerium oxide and at least one oxide selected from among $Al_2O_3$, $SiO_2$, $TiO_2$, $ZrO_2$, and MgO.

(8) An adsorbent for removing a sulfur compound as described in (1) above, wherein the adsorbent further contains at least one element selected from among the elements belonging to Groups 1 to 15 in the periodic table, said at least one element being carried on cerium oxide.

(9) An adsorbent for removing a sulfur compound as described in (8) above, wherein the cerium oxide on which at least one element selected from among the elements belonging to Groups 1 to 15 in the periodic table is carried is calcined at 400° C. or lower.

(10) An adsorbent for removing a sulfur compound as described in (8) above, wherein the amount of a carried compound, as reduced to the corresponding metallic element, of at least one element selected from among the elements belonging to Groups 1 to 15 in the periodic table is 1 to 90 mass % based on the entire amount of the adsorbent.

(11) An adsorbent for removing a sulfur compound as described in (1) above, wherein the cerium oxide is a complex oxide containing cerium, and at least one metallic element other than cerium selected from among the elements belonging to Groups 2 to 16 in the periodic table.

(12) An adsorbent for removing a sulfur compound as described in (1) above, wherein the hydrocarbon fuel is LPG, town gas, natural gas, naphtha, kerosene, gas oil, or at least one hydrocarbon compound or oxygen-containing hydrocarbon compound selected from among ethane, ethylene, propane, propylene, butane, butene, methanol, and dimethyl ether.

(13) A process for producing hydrogen, characterized in that the process comprises desulfurizing a hydrocarbon fuel through removal of a sulfur compound contained in a hydrocarbon fuel by use of an adsorbent as recited in (1) above and, subsequently, bringing the fuel which has been desulfurized into contact with a partial-oxidation reforming catalyst, an authothermal reforming catalyst, or a steam reforming catalyst.

(14) A process for producing hydrogen as described in (13) above, wherein the partial-oxidation reforming catalyst, the authothermal reforming catalyst, or the steam reforming catalyst contains ruthenium or nickel.

(15) A process for producing hydrogen for use in a fuel cell as described in (13) above, wherein desulfurizing is performed while no hydrogen or oxygen is added.

(16) A process for producing hydrogen as described in (13) above, wherein the sulfur compound is at least one species selected from among carbonyl sulfide, carbon disulfide, hydrogen sulfide, mercaptans, sulfides, and thiophenes.

(17) A process for producing hydrogen as described in (13) above, wherein desulfurizing is performed at 200° C. or lower.

(18) A process for producing hydrogen as described in (13) above, wherein desulfurizing is performed at 100° C. or lower.

(19) A fuel cell system characterized by employing hydrogen produced through a process for producing hydrogen as recited in any of (13) to (18) above.

BRIEF DESCRIPTION OF THE DRAWINGS

FIG. 1 shows a schematic diagram of an exemplary fuel cell system according to the present invention.

BEST MODES FOR CARRYING OUT THE INVENTION

The adsorbent for removing a sulfur compound of the present invention contains cerium oxide and is employed for removing a variety of sulfur compounds contained in a hydrocarbon fuel.

Examples of the sulfur compound include carbonyl sulfide, carbon disulfide, hydrogen sulfide, sulfur as simple substance, sulfur dioxide, mercaptans, sulfides, and thiophenes.

No particular limitation is imposed on the type of cerium oxide contained in the adsorbent of the present invention, and examples of the adsorbent include the followings:

(a) an adsorbent solo including cerium oxide or a complex oxide containing cerium and an element other than cerium (hereinafter referred to as Ce-M complex oxide);

(b) an adsorbent including a mixture of cerium oxide or a Ce-M complex oxide with another metal oxide;

(c) an adsorbent including a carrier formed of cerium oxide or a Ce-M complex oxide and an active metallic species carried thereon;

(d) an adsorbent including a carrier formed of cerium oxide or a Ce-M complex oxide and another metal oxide, and an active metallic species carried thereon;

(e) an adsorbent including a refractory porous carrier and cerium oxide or a Ce-M complex oxide carried thereon; and (f) an adsorbent including a refractory porous carrier and cerium oxide or a Ce-M complex oxide and an active metallic species carried thereon.

The element other than cerium for forming the aforementioned Ce-M complex oxide is at least one metallic element selected from among those belonging to Groups 2 to 16 in the periodic table. Specific examples of the Ce-M complex oxide include a Ce—Si complex oxide, a Ce—Zr complex oxide, and a Ce—Si—Zr complex oxide.

In the aforementioned (b) or (d), examples of metal oxides preferably used in combination with cerium oxide or a Ce-M complex oxide include oxides of a metal selected from among La, Sc, Y, Nd, Pr, Sm, Gd, and Yb. These metal oxides may be used singly or in combination of two or more species.

The active metallic species to be carried on a carrier in the (c) or (d) above may be selected from the elements belonging to Groups 1 to 15 in the periodic table. Specific examples include Cs, Ba, Yb, Ti, Zr, Hf, Nb, Mo, W, Mn, Re, Fe, Ru, Co, Rh, Ir, Ni, Pd, Pt, Cu, Ag, Au, Zn, Ga, In, Sn, and Bi. These elements may be used singly or in combination of two or more species. No particular limitation is imposed on the form of these elements, and oxides, metals, and other species may be used. Among these elements, Ag, Cu, Ni, Fe, Mn, etc. are preferred for a certain type and amount of sulfur compound contained in the hydrocarbon fuel.

Through incorporation of the aforementioned active species into a carrier formed of cerium oxide or a Ce-M complex oxide or a carrier formed of cerium oxide or a Ce-M complex oxide and another metal oxide, desulfurization performance of the produced adsorbent can be enhanced.

No particular limitation is imposed on the amount (as reduced to metallic element) of the aforementioned carried active metallic species, and the amount is generally 1 to 90 mass %, preferably 3 to 80 mass %, based on the sum of the active species amount and the carrier amount.

Examples of the refractory porous carrier employable in (e) or (f) above include silica, alumina, silica-alumina, titania, zirconia, zeolite, magnesia, diatomaceous earth, terra alba, and clay. These species may be used singly or in combination.

An adsorbent formed of any of the above refractory porous carrier and cerium oxide or a Ce-M complex oxide carried thereon is also preferably employed in the invention.

The adsorbent of the present invention preferably contains cerium oxide in an amount of 3 mass % or more, more preferably 10 mass % or more, from the viewpoint of desulfurization performance.

The cerium oxide contained in the adsorbent preferably has a mean crystallite size of 10 nm or less, more preferably 1 to 10 nm, from the viewpoint of desulfurization performance. The mean crystallite size of cerium oxide may be controlled during preparation of the adsorbent.

As used herein, the term "mean crystallite size" of the cerium oxide contained in the adsorbent refers to a particle size as determined under a transmission electron microscope. The particle is not necessarily crystalline, and the particle size refers to a primary particle size, regardless of whether the particle is crystalline or amorphous. The term "primary particles" refers to particles which are not aggregated or particles serving as unit fragments of an aggregate. Even when primary particles aggregate to form secondary particles, tertiary particles, or higher aggregated particles, the mean crystallite size of cerium oxide should be understood to refer to a primary particle size of cerium oxide. In the case where the observed particles are not uniform in size, 10 or more arbitrary primary particles are selected, and the particle sizes are averaged, thereby providing the mean crystallite size. In the case where rod-like or needle-like particles are included, each particle size is obtained from the width (shorter size) of the particle rather than from the length (longer size). When cerium oxide is carried on a carrier such as alumina, the mean crystallite size of $CeO_2$ refers to the primary particle size of the carried cerium oxide. When cerium oxide forms a solid solution with another oxide, the mean crystallite size refers to the primary particle size of the cerium-containing solid solution particles. In the aforementioned particle size determination through observation under a transmission electron microscope, when the particles are clearly distinct from one another, the particle size may be determined by use of an automated counter.

From the viewpoint of desulfurization performance, the aforementioned cerium oxide preferably exhibits a cumulative hydrogen consumption, as calculated up to 600° C. in a temperature-programmed reduction test (TPR), of 200 μmol/g or more, more preferably 300 μmol/g or more. In the temperature-programmed reduction test of cerium oxide, a sample (100 mg) was heated to 827° C. at a temperature elevation rate of 10° C./min while hydrogen (10% by volume in argon) is introduced at 20 mL/min, and the cumulative hydrogen consumption up to 600° C. was calculated.

During TPR of cerium oxide, two peaks attributed to reduction ($H_2$ consumption) are observed in a low temperature region (about 300 to 550° C.) and a high temperature region (827° C. or higher), respectively. When cerium oxide is reduced by hydrogen, $CeO_2$ converts to $Ce_2O_3$ in accordance with the following reaction scheme.

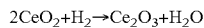

$$2CeO_2 + H_2 \rightarrow Ce_2O_3 + H_2O$$

Among two TPR peaks, the peak observed in a low temperature region is possibly attributed to reduction of surface oxygen of the $CeO_2$ particles, whereas the peak observed in a high temperature region is possibly attributed to reduction of bulk $CeO_2$. The study by the inventors revealed that the larger the peak in a low temperature region (i.e., hydrogen consumption), the more excellent desulfurization performance of cerium oxide at ambient temperature. Although the reason has not been completely elucidated, one possible reason is that oxygen atoms of cerium oxide which are reacted with $H_2$ at about 300 to 550° C. (i.e., reduced) react with a sulfur compound at ambient temperature, thereby chemically adsorbing the sulfur compound.

The adsorbent of the present invention preferably has a specific surface area of 20 $m^2/g$ or more, more preferably 50 $m^2/g$ or more, from the viewpoint of desulfurization performance. The specific surface area of the adsorbent may be determined by use of, for example, a specific surface area measurement apparatus (Product of Yuasa Ionics Inc.) through the following procedure.

Specifically, a sample (about 100 mg) is charged into a sample tube and, as a preliminary treatment, dehydrated by heating at 200° C. for 20 minutes under nitrogen flow. Subsequently, the dehydrated sample is brought into contact with flow of a mixture gas (nitrogen (30%)/helium (70%)) at liquid nitrogen temperature, so as to cause the sample to adsorb nitrogen. Then the adsorbed nitrogen is desorbed, and the amount of nitrogen desorbed is determined by means of a TCD detector, thereby determining the specific surface area of the sample.

The adsorbent of the present invention may be produced through the following procedure. In the case where the adsorbent is exclusively formed from cerium oxide, an aqueous solution containing a cerium sources (e.g., cerium nitrate) is brought into contact with an aqueous alkaline solution, thereby forming precipitations. The precipitated solid is separated through filtration, washed with water, and dried at about 50 to 200° C. The dried product is calcined at about 250 to 500° C., followed by molding (e.g., pelletization or extrusion) and pulverization to a particle size of interest.

Cerium oxide may be carried on a refractory porous carrier through a conventionally known method such as pore-filling, immersion, or vaporization to dryness. In this case, drying temperature is generally about 50 to 200° C., and calcination temperature is generally about 250 to 500° C.

Similarly, the aforementioned active metallic species may be carried on a carrier formed of cerium oxide or a similar compound, also through the aforementioned conventionally known method such as pore-filling, immersion, or vaporization to dryness. In this case, drying temperature is generally about 50 to 200° C., and calcination temperature is preferably 400° C. or lower, more preferably 100 to 400° C.

The thus-produced adsorbent of the present invention for removing a sulfur compound is employed for desulfurization of a hydrocarbon fuel. Examples of the hydrocarbon fuel include LPG; town gas; natural gas; naphtha; kerosene; gas oil; hydrocarbon compounds selected from among ethane, ethylene, propane, propylene, butane, and butene, and oxygen-containing hydrocarbon compounds. The oxygen-containing hydrocarbon compound may be at least one species selected from among alcohols such as methanol, ethanol, and isopropanol; and ethers such as dimethyl ether and methyl ethyl ether. Of these, dimethyl ether is particularly preferred.

The sulfur compound concentration of the hydrocarbon-fuel-containing gas to be treated with the adsorbent of the present invention is preferably 0.001 to 10,000 ppm by volume, particularly preferably 0.1 to 100 ppm by volume. Desulfurization is generally performed at a temperature of −50 to 200° C. and a GHSV (gas hourly space velocity) of 100 to 1,000,000 $h^{-1}$.

When the desulfurization temperature is higher than 200° C., sulfur compounds are not easily adsorbed. Thus, the desulfurization temperature is preferably −50 to 120° C., more preferably −20 to 100° C., and the GHSV is preferably 100 to 100,000 h$^{-1}$, more preferably 100 to 50,000 h$^{-1}$.

When the desulfurization is performed in the presence of hydrogen, some loaded metallic species may enhance desulfurization performance. However, addition of hydrogen is not essential during desulfurization in the presence of the catalyst of the present invention. Addition of oxygen should be avoided so as to prevent possible combustion (oxidation) of a hydrocarbon fuel.

According to the process of the present invention for producing hydrogen that can be used in a fuel cell, a hydrocarbon fuel is desulfurized by use of the aforementioned adsorbent of the invention so as to remove sulfur compounds, and the desulfurized fuel is reformed, thereby producing hydrogen.

The reforming may be performed by partial-oxidation reforming, autothermal reforming, or steam reforming. Upon the reforming, the desulfurized hydrocarbon fuel preferably has a sulfur compound concentration of 0.1 ppm by volume or less, particularly preferably 0.05 ppm by volume or less, from the viewpoint of the service life of each reforming catalyst.

The partial-oxidation reforming is a process for producing hydrogen through partial oxidation of hydrocarbon in the presence of a partial-oxidation reforming catalyst. The conditions generally employed are as follows: reaction pressure of ambient pressure to 5 MPa, reaction temperature of 400 to 1,100° C., GHSV of 1,000 to 100,000 h$^{-1}$, and oxygen ($O_2$) / carbon ratio of 0.2 to 0.8.

The autothermal reforming is a combination process of partial-oxidation reforming and steam reforming in the presence of an autothermal reforming catalyst. The conditions generally employed are as follows: reaction pressure of ambient pressure to 5 MPa, reaction temperature of 400 to 1,100° C., oxygen ($O_2$)/carbon ratio of 0.1 to 1, steam/carbon ratio of 0.1 to 10, and GHSV of 1,000 to 100,000 h$^{-1}$.

The steam reforming is a process for producing hydrogen through causing hydrocarbon into contact with steam in the presence of a steam reforming catalyst. The conditions generally employed are as follows: reaction pressure of ambient pressure to 3 MPa, reaction temperature of 200 to 900° C., steam/carbon ratio of 1.5 to 10, and GHSV of 1,000 to 100,000 h$^{-1}$.

In the present invention, the aforementioned partial-oxidation reforming catalyst, autothermal reforming catalyst, and steam reforming catalyst may be appropriately selected from conventionally known catalysts. Among them, a ruthenium-containing catalyst and a nickel-containing catalyst are particularly preferred. Examples of preferred carrier for the catalysts include at lease one species selected from among manganese oxide, cerium oxide, and zirconia. The carrier may be exclusively formed of a metal oxide. Thus, any of the aforementioned metal oxides may be incorporated into a refractory porous inorganic oxide such as alumina, thereby serving as a carrier.

The present invention also provides a fuel cell system employing hydrogen produced through the aforementioned process. The fuel cell system of the present invention will next be described with reference to the attached FIG. 1.

FIG. 1 shows a schematic diagram of an exemplary fuel cell system according to the present invention. As shown in FIG. 1, a fuel contained in a fuel tank 21 is fed to a desulfurizer 23 through a fuel pump 22. The adsorbent of the present invention may be put into the desulfurizer. The fuel which has been desulfrized by the desulfurizer 23 is mingled with water fed from a water tank through a water pump 24, and the fuel mixture is fed to a gasifier 1 so as to gasify the mixture. The fuel mixture gas is mixed with air fed by means of an air blower 35, and the gas is transferred to a reforming apparatus 31.

The aforementioned reforming catalyst has been charged into the reforming apparatus 31. Through any of the aforementioned reforming reactions, hydrogen or synthesis gas is produced from a fuel mixture (gas mixture containing steam, oxygen, and a hydrocarbon fuel or an oxygen-containing hydrocarbon fuel) fed into the reforming apparatus 31.

The thus-produced hydrogen or synthesis gas is transferred to a CO converter 32 and/or a CO-selective oxidizer 33 for reducing the CO concentration so as not to affect the characteristics of the produced fuel cell. Examples of the catalyst used in the CO converter 32 include iron-chromium catalysts, copper-zinc catalysts, and noble metal catalysts. Examples of the catalyst used in the CO-selective oxidizer 33 include ruthenium catalysts, platinum catalysts, and mixtures thereof.

A fuel cell 34 is a polymer electrolyte fuel cell including a negative electrode 34A, a positive electrode 34B, and a polymer electrolyte 34C provided therebetween. The hydrogen-rich gas produced through the above method is fed to the negative electrode, while air is fed to the positive electrode through the air blower 35. If required, these gases undergo appropriate humidification (by means of a humidifier not illustrated) before introduction to the electrodes.

In the negative electrode, dissociation of hydrogen to proton and electron occurs, while in the positive electrode reaction of oxygen with electron and proton to form water occurs, whereby direct current is provided between the electrodes 34A and 34B. The negative electrode is formed of platinum black, a Pt-on-activated carbon catalyst, a Pt—Ru alloy catalyst, etc. The positive electrode is formed of platinum black, a Pt-on-activated carbon catalyst, etc.

When a burner 31A of the reforming apparatus 31 is connected with the negative electrode 34A, excess hydrogen may be used as a fuel. In a liquid/gas separator 36 connected with the positive electrode 34B, a discharge gas is separated from water which has been formed from oxygen and hydrogen contained in air fed to the positive electrode 34B. The separated water may be use for forming steam.

Notably, since the fuel cell 34 generates heat during electric power generation, the heat is recovered through provision of an exhausted heat recovering apparatus 37 so as to effectively use the recovered heat. The exhausted heat recovering apparatus 37 includes a heat-exchanger 37A for absorbing heat generated during reaction; a heat-exchanger 37B for transferring the heat absorbed in the heat exchanger 37A to water; a cooler 37C, and a pump 37D for circulating a cooling medium to the heat-exchangers 37A and 37B and the cooler 37C. Hot water obtained in the heat exchanger 37B may be effectively used in other facilities.

EXAMPLES

The present invention will next be described in more detail by way of examples, which should not be construed as limiting the invention thereto.

Average crystallite size of cerium oxide, cumulative $H_2$ consumption determined by the TRP test ($\leqq$600° C.), and specific surface area of the desulfurizing agents produced in the Examples were determined in accordance with the methods described in the present specification.

Example 1

To a solution of cerium nitrate hexahydrate (special reagent grade, product of Wako Pure Chemical Industries, Ltd.) (470 g) dissolved in ion-exchanged water (water which is purified with ion-exchange membrane, 1 L) heated at 50° C., an aqueous solution of NaOH (3 mol/L) was added dropwise under stirring so as to adjust the pH of the mixed solution to 13. The mixed solution was further stirred for one hour at a constant temperature of 50° C.

Subsequently, the formed solid was separated through filtration, washed with ion-exchanged water (20 L), and the washed product was dried at 110° C. for 12 hours in an oven having blower. The dried product was calcined at 350° C. for three hours. The calcined product was pelletized and pulverized, thereby producing an adsorbent for removing sulfur compounds (hereinafter referred to simply as desulfurizing agent) formed of $CeO_2$ (A) having a particle size of 0.5 to 1.0 mm. The properties of the desulfurizing agent are shown in Table 1.

Example 2

To a solution of cerium nitrate hexahydrate (special reagent grade, product of Wako Pure Chemical Industries, Ltd.) (470 g) dissolved in ion-exchanged water (1 L) heated at 50° C., ammonia solution (30 mass %) was added dropwise under stirring so as to adjust the pH of the mixed solution to 12. The mixed solution was further stirred for one hour at a constant temperature of 50° C.

Subsequently, the formed solid was separated through filtration, washed with ion-exchanged water (20 L), and the washed product was dried at 110° C. for 12 hours in an oven having blower. The dried product was calcined at 350° C. for three hours. The calcined product was pelletized and pulverized, thereby producing a desulfurizing agent formed of $CeO_2$ (B) having a particle size of 0.5 to 1.0 mm. The properties of the desulfurizing agent are shown in Table 1.

Example 3

Cerium nitrate hexahydrate (special reagent grade, product of Wako Pure Chemical Industries, Ltd.) (605 g) and zirconyl nitrate dihydrate (special reagent grade, product of Wako Pure Chemical Industries, Ltd.) (52.0 g) were dissolved in ion-exchanged water (1 L) heated at 50° C., thereby producing a preparation liquid A. A 3N NaOH solution was separately prepared to serve as a preparation liquid B. The preparation liquid B was added dropwise to the preparation liquid A under stirring so as to adjust the pH of the mixed solution to 13.9. The mixed solution was further stirred for one hour at a constant temperature of 50° C.

Subsequently, the formed solid was washed with ion-exchanged water, separated through filtration, and the separated product was dried at 110° C. for 12 hours in an oven having blower. The dried product was calcined at 400° C. for three hours. The calcined product was pelletized and pulverized, thereby producing a desulfurizing agent formed of a mixture of $CeO_2$ and $ZrO_2$ (50:50 by mass, $CeO_2$ (50)-$ZrO_2$ (50)) having a mean particle size of 0.8 mm. The properties of the desulfurizing agent are shown in Table 1.

Example 4

Cerium nitrate hexahydrate (special reagent grade, product of Wako Pure Chemical Industries, Ltd.) (310 g) was dissolved in ion-exchanged water (60 mL) heated at 50° C. To the solution, alumina (KHD-24) (400 g)was added so as to impregnate alumina with the solution. The solution-impregnated alumina was dried at 110° C. for 12 hours in an oven having blower. The dried product was calcined at 400° C. for three hours. The calcined product was pelletized and pulverized, thereby producing a desulfurizing agent formed of $CeO_2$ (20)/$Al_2O_3$ (80) ($CeO_2$ (20 parts by mass) is carried by $Al_2O_3$ carrier (80 parts by mass)) having a particle size of 0.5 to 1.0 mm. The properties of the desulfurizing agent are shown in Table 1.

Comparative Example 1

The $CeO_2$ (B) produced in Example 2 was placed in a muffle furnace, and calcined at 800° C. for six hours, thereby producing a desulfurizing agent formed of $CeO_2$ (C). The properties of the desulfurizing agent are shown in Table 1.

Comparative Examples 2 to 6

Commercial products of $MnO_2$, ZnO, alumina, β-type zeolite, and activated carbon were employed as desulfurizing agents of Comparative Examples 2 to 6, respectively. Specific surface area of these desulfurizing agents are shown in Table 1.

Test Example 1

Each of the desulfurizing agents produced in Examples 1 to 4 and Comparative Examples 1 to 6 was molded and pelletized to a particle size of 0.5 to 1 mm. The desulfurizing agent (1 cm$^3$) was packed into a desulfurization tube (inner diameter: 9 mm). COS, dimethyl sulfide (DMS), t-butylmercaptan (TBM), and dimethyl disulfide (DMDS) (each 10 ppm by volume, total 40 ppm by volume) were incorporated into propane gas, and the sulfur-compounds-containing gas was caused to flow through the tube under the conditions: a desulfuruzing agent temperature of 20° C., ambient pressure, and a GHSV (gas hourly space velocity) of 30,000 h$^{-1}$.

Each sulfur compound concentration at the outlet of the desulfurization tube was determined hourly by means of a gas chromatograph equipped with an SCD (sulfur chemiluminescence detector). The time at which the sulfur compound concentration exceeded 0.1 ppm by volume and the total amount of adsorbed sulfur are shown in Table 2.

TABLE 1

| | | CeO$_2$ | | |
|---|---|---|---|---|
| | Component of Desulfurizing agent | Specific surface area of desulfurizing agent (m$^2$/g) | Mean crystallite size (nm) | H$_2$ consumption [≦600° C.] (μmol/g-CeO$_2$) |
| Ex. 1 | CeO$_2$ (A) | 147 | 5 | 466 |
| Ex. 2 | CeO$_2$ (B) | 121 | 3 | 326 |
| Comp. Ex. 1 | CeO$_2$ (C) | 21 | 20-100 | 102 |
| Ex. 3 | CeO$_2$ (50)-ZrO$_2$ (50) | 125 | 10 | 2,540 |
| Ex. 4 | CeO$_2$ (20)/Al$_2$O$_3$ (80) | 204 | 10 | 1,665 |
| Comp. Ex. 2 | MnO$_2$ | 301 | | |
| Comp. Ex. 3 | ZnO | 18 | | |
| Comp. Ex. 4 | Alumina | 271 | | (6) * |
| Comp. Ex. 5 | β-Type zeolite | 638 | | |
| Comp. Ex. 6 | Activated carbon | 1,080 | | |

* (): value per gram of alumina

TABLE 2

| | Time at which concentration exceeded 0.1 ppm (h) | Total amount of adsorbed sulfur (S g/mL) |
|---|---|---|
| Ex. 1 | 5 | 1.42 |
| Ex. 2 | 5 | 1.03 |
| Comp. Ex. 1 | 2 | 0.70 |
| Ex. 3 | 3 | 0.95 |
| Ex. 4 | 2 | 0.62 |
| Comp. Ex. 2 | 0 | 0.11 |
| Comp. Ex. 3 | 0 | 0.19 |
| Comp. Ex. 4 | 0 | 0.38 |
| Comp. Ex. 5 | 0 | 0.53 |

As is clear from Tables 1 and 2, the desulfurizing agents of Comparative Examples formed of porous material are difficult to lower the sulfur compound concentration to less than 0.1 ppm. However, the desulfurizing agents of Examples containing a specific cerium oxide exhibit remarkable desulfurization performance.

Examples 5 to 10

Cerium oxide (A) was impregnated with a salt of each of the metals shown in Table 3, followed by drying at 120° C. and calcining at 400° C., thereby producing a desulfurizing agent containing a carried metal element (shown in Table 3) in an amount of 10 mass % with respect to the entire amount of the desulfurizing agent.

Comparative Example 7

A desulfurizing agent was produced from β-type zeolite and Ag carried thereon in an amount of 10 mass % with respect to the entire amount of the desulfurizing agent.

Test Example 2

Each of the desulfurizing agents produced in Examples 5 to 10 and Comparative Example 7 was molded and pelletized to a particle size of 0.5 to 1 mm. The desulfurizing agent (1 cm$^3$) was packed into a desulfurization tube (inner diameter: 9 mm). Propane gas containing COS (40 vol. ppm) was caused to flow through the tube under the conditions: a desulfuruzing agent temperature of 20° C., ambient pressure, and a GHSV of 30,000 h$^{-1}$.

COS concentration at the outlet of the desulfurization tube was determined hourly by means of a gas chromatograph equipped with an SCD (sulfur chemiluminescence detector). The time at which the COS concentration exceeded 0.1 ppm by volume is shown in Table 3.

TABLE 3

| | Type of carrier | Metal loaded | | Time at which COS concentration exceed 0.1 vol ppm (h) |
|---|---|---|---|---|
| | | Metal | Amount (mass %) | |
| Ex. 5 | CeO$_2$ (A) | — | — | 9 |
| Ex. 6 | CeO$_2$ (A) | Ag | 10 | 15 |
| Ex. 7 | CeO$_2$ (A) | Cu | 10 | 11 |
| Ex. 8 | CeO$_2$ (A) | Ni | 10 | 15< |
| Ex. 9 | CeO$_2$ (A) | Fe | 10 | 15 |
| Ex. 10 | CeO$_2$ (A) | Mn | 10 | 15< |
| Comp. Ex. 7 | β-zeolite | Ag | 10 | 0 |

As is clear from Table 3, carbonyl sulfide is effectively removed by Ni/CeO$_2$ and Mn/CeO$_2$.

Examples 11 to 15

Cerium oxide (A) was impregnated with a silver nitride solution so as to cause Ag to be loaded on cerium oxide in an amount of 10 mass % with respect to the entire amount. The Ag-containing cerium oxide was dried (calcined) at 120° C. and further calcined at each temperature shown in Table 4, thereby producing a desulfurizing agent.

Test Example 3

Each of the desulfurizing agents produced in Examples 11 to 15 was molded and pelletized to a particle size of 0.5 to 1 mm. The desulfurizing agent (1 cm$^3$) was packed into a desulfurization tube (inner diameter: 9 mm). Propane gas containing dimethyl sulfide (DMS) (40 vol. ppm) was caused to flow through the tube under the conditions: a desulfuruzing agent temperature of 20° C., ambient pressure, and a GHSV of 30,000 h$^{-1}$.

Dimethyl sulfide concentration at the outlet of the desulfurization tube was determined hourly by means of a gas chromatograph equipped with an SCD (sulfur chemiluminescence detector). The time at which the dimethyl sulfide concentration exceeded 0.1 ppm by volume is shown in Table 4.

TABLE 4

| | Type of carrier | Metal loaded | | Calcination temp. (° C.) | Time at which DMS concentration exceed 0.1 vol ppm (h) |
|---|---|---|---|---|---|
| | | Metal | Amount (mass %) | | |
| Ex. 11 | CeO$_2$ (A) | Ag | 10 | 500 | 6 |
| Ex. 12 | CeO$_2$ (A) | Ag | 10 | 400 | 10 |
| Ex. 13 | CeO$_2$ (A) | Ag | 10 | 300 | 12 |
| Ex. 14 | CeO$_2$ (A) | Ag | 10 | 200 | 13 |
| Ex. 15 | CeO$_2$ (A) | Ag | 10 | 120 | 14 |

As is clear from Table 4, within a calcination temperature range of 120 to 500° C., the lower the calcination temperature, the longer the time for causing the dimethyl sulfide concentration to exceed 0.1 vol. ppm. The tendency indicates that the amount of adsorbed sulfur increases as the calcination temperature is lowered.

INDUSTRIAL APPLICABILITY

The present invention can provide an adsorbent for removal of sulfur compounds, which adsorbent can effectively remove sulfur compounds contained in a hydrocarbon fuel to a low concentration even at room temperature; a process for effectively producing hydrogen that can be used in a fuel cell from the hydrocarbon fuel which has been desulfurized by use of the adsorbent; and a fuel cell system employing hydrogen produced through the process.

The invention claimed is:

1. A process for producing hydrogen, comprising:
desulfurizing a hydrocarbon fuel by contacting the hydrocarbon fuel to an adsorbent comprising cerium oxide, primary particles of the cerium oxide having a mean crystallite size of 10 nm or less; and
subsequently reforming the desulfurized fuel by bringing the desulfurized fuel into contact with a catalyst comprising at least one member selected from the group consisting of a partial-oxidation reforming catalyst, an autothermal reforming catalyst, and a steam reforming catalyst;
wherein:
neither hydrogen nor oxygen is added while desulfurizing the hydrocarbon fuel; and
the cerium oxide is a cerium oxide that has been calcined at a temperature of from 120 to 400° C., the cerium oxide being selected from the group consisting of cerium oxide alone, cerium oxide carried on a porous refractory carrier comprising alumina or zirconia, and cerium oxide carrying at least one metal selected from the group consisting of silver, copper, nickel, iron and manganese.

2. The process of claim 1, wherein the catalyst comprises at least one member selected from the group consisting of ruthenium and nickel.

3. The process of claim 1, wherein desulfurizing comprises removing at least one sulfur compound selected from the group consisting of carbonyl sulfide, carbon disulfide, hydrogen sulfide, mercaptans, sulfides, and thiophenes.

4. The process of claim 1, wherein the adsorbent has a specific surface area of 20 m$^2$/g or more.

5. The process of claim 1, wherein the adsorbent has a specific surface area of 50 m$^2$/g or more.

6. The process of claim 1, wherein the cerium oxide exhibits a cumulative hydrogen consumption, as calculated up to 600° C. in a temperature-programmed reduction test, of 200 μmol/g or more.

7. The process of claim 1, wherein the cerium oxide exhibits a cumulative hydrogen consumption, as calculated up to 600° C. in a temperature-programmed reduction test, of 300 μmol/g or more.

8. The process of claim 1, wherein the at least one metal is present in an amount of from 1 to 90 mass % based on a total mass of the adsorbent.

9. The process of claim 1, wherein the hydrocarbon fuel is selected from the group consisting of LPG, town gas, natural gas, naphtha, kerosene, gas oil, ethane, ethylene, propane, propylene, butane, butene, methanol, and dimethyl ether.

10. A fuel cell system, comprising:
a desulfurizer; and
a reforming apparatus;
wherein:
the desulfurizer comprises an adsorbent comprising cerium oxide having primary particles with a mean crystallite size of 10 nm or less, the desulfurizer being configured so that a hydrocarbon fuel can be contacted to the adsorbent; and
the reforming apparatus comprises a catalyst comprising at least one member selected from the group consisting of a partial-oxidation reforming catalyst, an autothermal reforming catalyst, and a steam reforming catalyst, the reforming apparatus being configured so that a desulfurized fuel can be contacted to the catalyst;
wherein:
the system is configured so that neither hydrogen nor oxygen is added when desulfurization is performed;
the cerium oxide is a cerium oxide that has been calcined at a temperature of from 120 to 400° C.; and
the cerium oxide is selected from the group consisting of cerium oxide alone, cerium oxide carried on a porous refractory carrier comprising alumina or zirconia, and cerium oxide carrying at least one metal selected from the group consisting of silver, copper, nickel, iron and manganese.

* * * * *